May 14, 1968     J. E. SCHOLL     3,382,711

LOAD TEST APPARATUS

Filed March 15, 1966     2 Sheets-Sheet 1

INVENTOR
JAMES E. SCHOLL

Claude Funkhouser
ATTORNEY

Neal E. Abrams
AGENT

BY

United States Patent Office 3,382,711
Patented May 14, 1968

3,382,711
LOAD TEST APPARATUS
James E. Scholl, Fairfax, Va., assignor to the United States of America as represented by the Secretary of the Navy
Filed Mar. 15, 1966, Ser. No. 537,593
6 Claims. (Cl. 73—146)

ABSTRACT OF THE DISCLOSURE

An apparatus for load testing a specimen of a roadway surface consisting of a loaded reciprocable wheel and a test bed which can be laterally indexed. The road surface specimen is supported by rubber-like blocks of a resiliency selected to approximate the resiliency of the road bed with which the roadway surface will be used.

---

Figure 1:
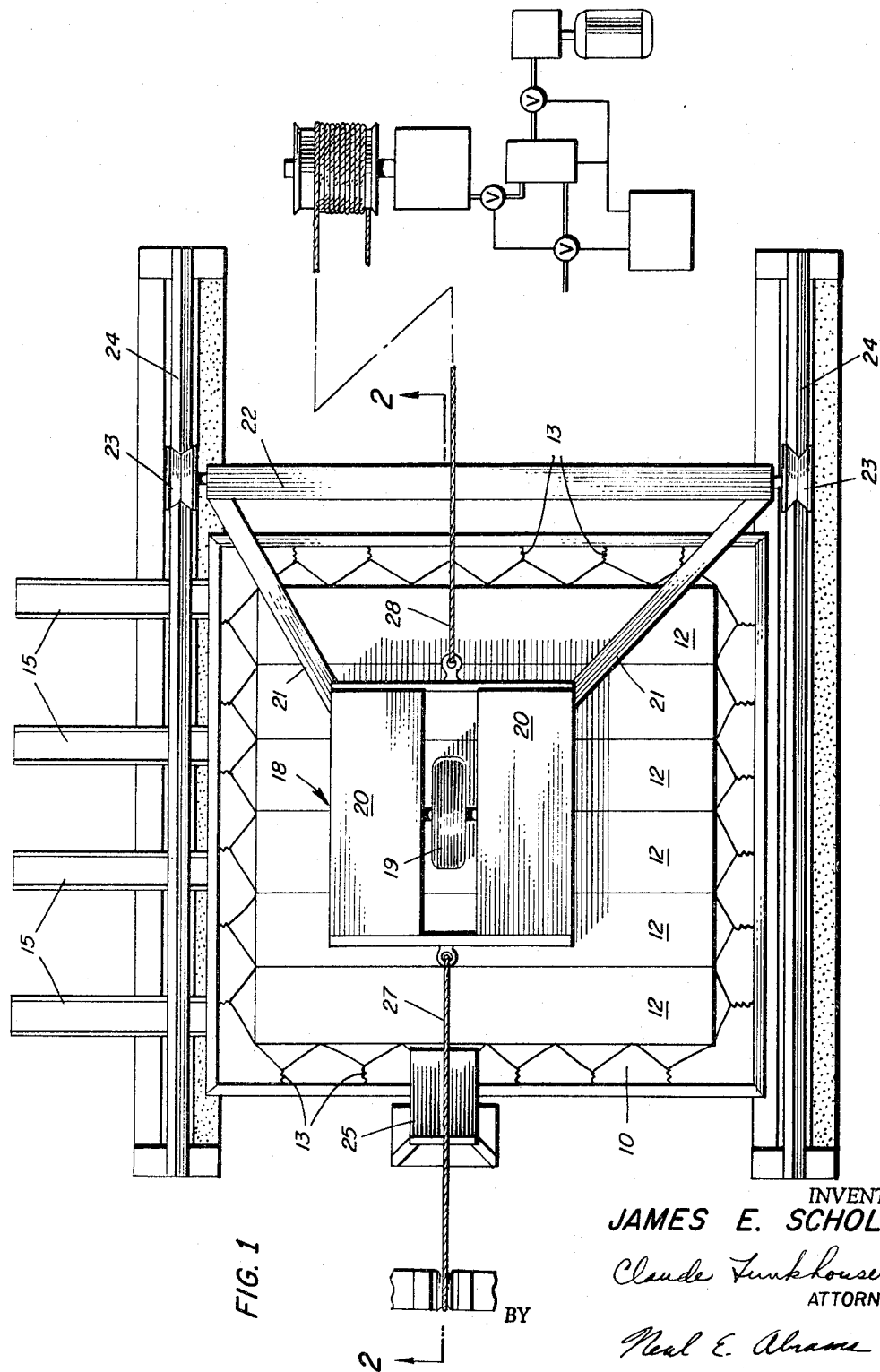

The invention described herein may be manufactured and used by or for the Government of the United States of America for governmental purposes without the payment of any royalties thereon or therefor.

This invention relates generally to load test apparatus and more particularly to apparatus for testing sections of roadway and the like.

In testing the strength, toughness and adaptability of various types of roadways, and in particular those roadways of a portable type which are designed to be quickly transported and laid over diverse ground conditions, it is advantageous to test under conditions approximating those of actual use before the selection of type is made. An obvious way to do so is to lay a section of the road and subject this section to travel by the actual vehicles which would be used upon it. However, the problem is made difficult by the fact that the strength characteristics of the roadway depends to a great degree upon the type of ground, or base, upon which it is placed. This is especially true of portable mat type roadways which are meant to be quickly positioned upon many types of bases and subjected to both land vehicle and aircraft loads. In order to take into account the effect of varying roadway bases such as sand, gravel, and stone those who have tested in the past have first constructed roadway bases of these varying types and then placed a roadway sample or a portable mat section upon the base, then subjecting the specimen to loads imposed by wheeled vehicles such as weighted trucks or dollys. Obviously, this method of testing was expensive and time consuming.

By the instant invention, a method and apparatus for testing various types of roadways and portable roadway mat sections is provided. The apparatus consists basically of a table or rubber blocks of such resiliency as to approximate that of the roadbed, and upon which the specimen is placed, and a weighted wheeled cart which rolls back and forth on the specimen. The table upon which the specimen is mounted is equipped with indexing apparatus so that as the wheeled cart moves back and forth longitudinally, the specimen can be indexed laterally to expose the entire surface to the wheeled cart. When compared to the cost of prior test methods, this apparatus is relatively inexpensive and provides a base set of standards so that the various sections of roadway tested may be easily compared to one another.

It is therefore an object of the present invention to provide a method and apparatus for testing sections of permanent and portable roadways.

Another object of this invention is to provide an apparatus for testing sections of roadways in which various types of roadbeds can be simulated for more comprehensive analysis.

Another object of the present invention is to provide a means for testing sections of roadways which inherently provides a stable standard in order to facilitate the comparison of data after a series of tests.

Figure 2:
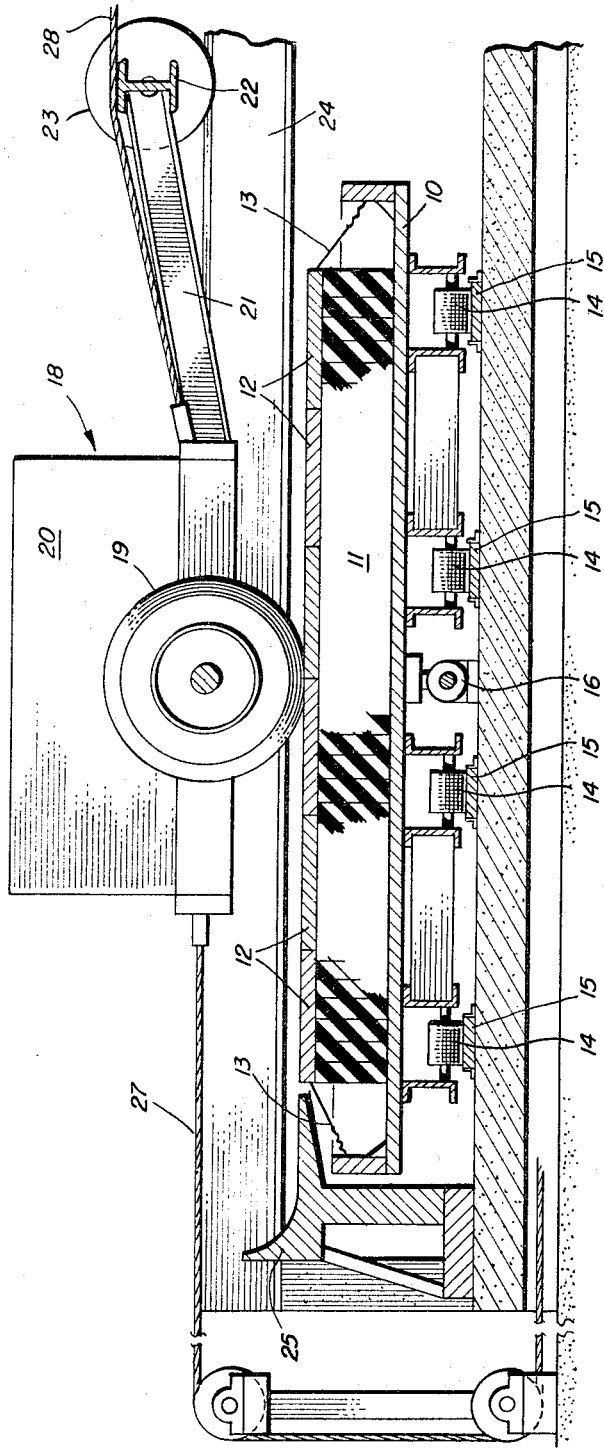

Other objects, advantages and novel features of the present invention will become apparent from the following detailed description when considered in conjunction with the accompanying drawings wherein:

FIG. 1 is a top plan view of an apparatus constructed in accordance with the present invention; and FIG. 2 is a side elevation taken through lines 2—2 of FIG. 1.

As shown in the drawings, the instant invention comprises a specimen table 10 upon which are placed rubber blocks 11, which are of predetermined consistency to simulate the roadbed, or base, upon which the roadway sample would be laid in actual use. Upon rubber blocks 11 is placed the sample of roadway 12, shown for illustrative purposes only as a portion of a portable metal roadway. The specimen of roadway 12 is advantageously side supported by a reaction device 13, such as springs or other means for preventing the specimen from moving around on the table. Specimen table 10 is supported by a plurality of rollers 14 which move on tracks 15 as driven for lateral indexing by an electric or hydraulic cylinder or motor 16. This lateral indexing allows the entire mat specimen to be subjected to the test loads.

The mechanism which subjects the specimen 12 to stresses and strains consists of a wheeled cart 18 which includes at least one loading wheel 19 and a plurality of weights 20. The wheel 19 engages the specimen 12 and the cart is aligned and moved back and forth by action of a frame 21 attached to axle 22 upon which are guide wheels 23 in engagement with guide rails 24. These rails 24 are mounted alongside and above the test bed 10. The cart 18 is moved back and forth longitudinally over the specimen 12 from an approach ramp 25 by any system such as a plurality of cables 27 and 28 acting through sheaves and return sheaves and connected to an electric or hydraulic motor with suitable valving, programming, and reversing gear.

The operation of the apparatus is as follows: Rubber blocks or blocks of a rubber-like material of the proper consistency to simulate a proposed roadbed are placed upon specimen table 10 and the specimen of roadway 12 properly mounted on top of blocks 11. The table is then laterally indexed in order to place the cart 18, which is on approach ramp 25, adjacent one end of the specimen. Cart 18 can be loaded with any suitable weight to simulate the type of vehicle which will be using the roadway or to simulate a maximum stress load to be placed upon a roadway. The mechanism which moves cart 18 is then activated so that the wheel 19 begins to move back and forth longitudinally across the specimen 12. As the cart 18 is being moved longitudinally the lateral indexing system under table 10 may be activated which after a predetermined number of passes by cart 18 will cause the table to be indexed laterally thus placing another portion of specimen 12 under the load of the wheel. The frequency of longitudinal movement of cart 18 per index laterally of the table is controlled in accordance with the loading required for the test. It should be noted that indexing is best accomplished after a back and forth cycle in which the wheel 19 has come to rest on approach ramp 25. A typical test might, for example, feature a loading of cart 18 of a hundred thousand pounds to be cycled sixteen hundred times back and forth over a specimen which is ten feet by ten feet, with lateral movement of six inches after each eighty cycles.

It is thus seen that the instant invention provides a laboratory method of reproducing conditions upon which a roadway can be tested without going to the trouble and expense of actually laying it. Obviously, the success of the apparatus depends in some part on the user's skill in selecting a proper consistency of rubber blocks to be used under the specimen in order to simulate the roadbed upon which the specimen would be placed. However, once the users of the instant invention have experimented to find a rubber base which properly simulates the desired roadbed, a major part of this problem has been overcome. The apparatus is relatively simple in construction and the conduct of the test is accomplished under laboratory conditions in which it is possible to easily compare the durability of the various test specimens.

Obviously many modifications and variations of the present invention are possible in the light of the above teachings. It is therefore to be understood that within the scope of the appended claims the invention may be practiced otherwise than as specifically described.

What is claimed is:

1. An apparatus for load testing a specimen of roadway, comprising
   a resilient test bed for supporting said specimen, said resilient test bed comprising a plurality of rubberlike blocks of predetermined resiliency, the degree of resiliency being so selected as to simulate the resiliency of the roadbed upon which it is desired to place said roadway specimen in actual use, whereby the roadway is tested under conditions simulating the actual use conditions,
   a weighted cart having at least one wheel, and
   means for moving said cart back and forth longitudinally across said specimen with said wheel in contact with said specimen.
2. The combination of claim 1 further comprising
   means for laterally indexing said test bed to expose another portion of said specimen to the action of said wheel.
3. The combination of claim 2 wherein said means for laterally indexing comprises
   a plurality of laterally aligned rollers supporting said test bed, and
   an indexing motor.
4. The combination of claim 3 and further comprising
   a ramp positioned at one end of said test bed and in lateral alignment with said wheel, whereby said cart can be moved entirely off of said test bed during indexing.
5. The combination of claim 4 wherein said test bed further comprises
   means for side supporting said specimen against lateral and longitudinal movement in relation to said test bed.
6. The combination of claim 5 wherein said cart further comprises
   a plurality of guide wheels attached to said cart and aligned longitudinally, and
   wherein said testing apparatus further comprises a plurality of guide rails fixed with respect to said test bed and longitudinally aligned therewith, whereby said guide wheels and said guide rails cooperate to guide said cart in its longitudinal movement.

References Cited

Hogentogler, "Bulletin of the National Research Council," vol. 6, part 4, No. 35, August 1923 (pp. 35 and 36 relied on).

DAVID SCHONBERG, *Primary Examiner.*

D. O. WOODIEL, *Examiner.*